United States Patent [19]
Cornsweet

[11] 3,832,066
[45] Aug. 27, 1974

[54] APPARATUS AND METHOD FOR ANALYZING SPHERO-CYLINDRICAL OPTICAL SYSTEMS

[75] Inventor: Tom N. Cornsweet, Washington, D.C.

[73] Assignee: Acuity Systems, Incorporated, McLean, Va.

[22] Filed: Oct. 27, 1972

[21] Appl. No.: 301,366

[52] U.S. Cl............... 356/127, 356/125, 351/6
[51] Int. Cl. .............................................. G01h 9/00
[58] Field of Search ........... 356/127, 126, 125, 124, 356/12 C, 127; 351/6

[56] References Cited
UNITED STATES PATENTS

| | | | |
|---|---|---|---|
| 1,204,030 | 11/1916 | Kellner .................................. | 356/127 |
| 1,608,725 | 11/1926 | Currier et al. ...................... | 356/127 |
| 2,792,748 | 5/1957 | Whitney et al. ..................... | 356/127 |
| 2,803,995 | 8/1957 | Gunter et al......................... | 356/127 |
| 2,897,722 | 8/1959 | Gunter et al......................... | 356/126 |
| 3,207,904 | 9/1965 | Heinz.................................... | 250/208 |
| 3,445,665 | 5/1969 | Laughman ............................ | 356/126 |
| 3,536,383 | 10/1970 | Cornsweet et al.................... | 351/16 |

OTHER PUBLICATIONS

Strong, Concepts of Classical Optics, Freeman & Sons, San Francisco, 1958, pp. 353–355.

Primary Examiner—John K. Corbin
Assistant Examiner—Conrad Clark
Attorney, Agent, or Firm—Cushman, Darby & Cushman

[57] ABSTRACT

An apparent line source of collimated light is projected through a sphero-cylindrical lens under test onto a quadrant photodetector and is then relatively rotated in the plane of the detector to provide substantial alignment of the line source with one of the parting axes of said detector to define and orient the cylindrical axis of said lens. Subsequent movement of the detector along the optical axis of the system defined by the line source, the lens under test and the intersection of the parting axes of the detector provides a phase reversal or other null point of the signal generated in said detector as it moves through the focus of the lens. The position of the focus thus provides the power of the lens.

24 Claims, 5 Drawing Figures

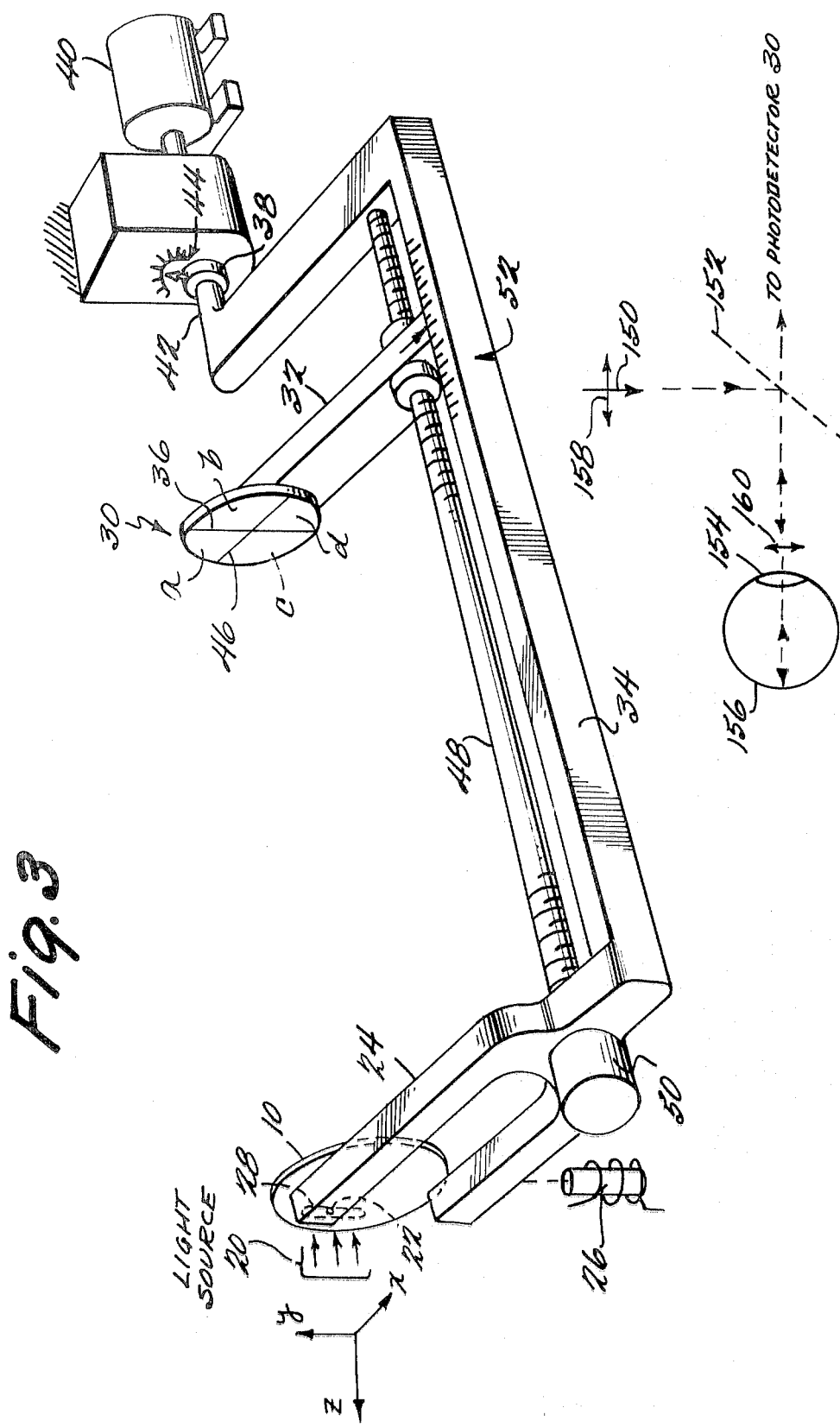

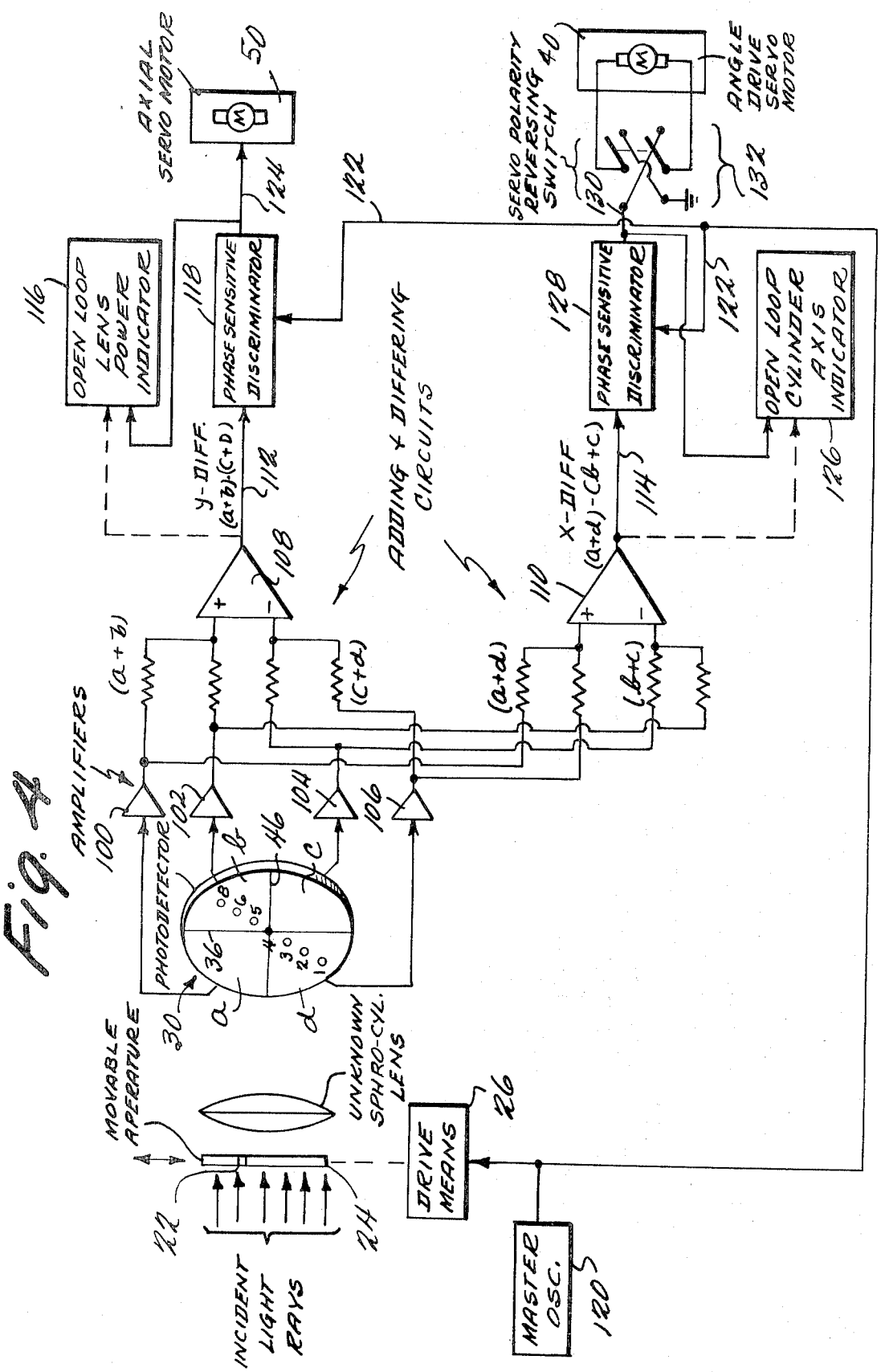

APPARATUS AND METHOD FOR ANALYZING SPHERO-CYLINDRICAL OPTICAL SYSTEMS

This invention generally relates to apparatus and method for measuring optical properties of optical systems. In particular, this invention is directed towards measuring the optical properties of a sphero-cylindrical lens or other optical system such as the human eye where astigmatism is involved. Such parameters are, for instance, cylinder axis, spherical lens power and cylindrical lens power.

A sphero-cylindrical lens or other optical system having sphero-cylindrical properties (i.e., an astigmatic human eye) operates upon incident light rays as though it were a combination of a spherical lens with some given power and a cylindrical lens having some given power. The cylinder component operates as if the cylinder axis is at some particular angular orientation within a plane perpendicular to the optic axis of the system as will be appreciated by those in the art. Many spectacle lens are examples in that they are constructed by grinding a spherical surface on one side of a glass blank and a cylindrical surface on the other side. The optical characteristics of many human eyes are a common example if they exhibit what is called "regular astigmatism."

It is commonly known that parallel light rays incident upon an ordinary spherical lens will be focused to a point in space at a particular distance from the lens. That particular distance is a measure of the most important property of a purely spherical lens, namely, its power, and the distance to this focal point is often called the focal length of the spherical lens.

However, if the lens is a sphero-cylindrical optical system as described above, there are actually two different distances from the lens at which incident parallel light rays are refracted to a most concentrated area. That is, with a source image located at infinity, there will be two different distances from this sphero-cylindrical lens at which the light distribution resulting from the refracted light can be described as an image of the source. If the incident removed source is a point, such as a star, the two images will appear as short lines, perpendicular to each other. The distance from the sphero-cylindrical lens to either one of these lines or foci is a measure of the spherical power of the lens while the distance between these two foci is a measure of the cylindrical power of the lens. These two numbers (i.e., spherical power and cylindrical power) plus the diameter of the sphero-cylindrical lens form a complete description of the first order optical properties of the system. Of course, as those in the art will appreciate, there are many second and third order properties such as aberrations, transmissivity, etc. in addition to these first order properties.

Furthermore, the relative position or orientation of the axis for the cylinder component of a sphero-cylindrical optical system is usually described with respect to some reference or landmark on the lens. In some sphero-cylindrical systems this cylinder axis position may be defined with respect to some other reference such as horizontal if it is actually part of a larger system that always has a specific orientation with respect to gravity such as in the case of the human eye. In any event, the angular position of one of the two line images from an infinitely removed point source will always appear parallel to the axis of the cylinder while the other image will be perpendicular to the cylinder axis.

As described in more detail below, this invention relates to apparatus and method for accurately and efficiently determining these first order attributes of a sphero-cylindrical optical system, namely spherical and cylindrical power and the cylinder axis. Of course, after a complete understanding of this invention those in the art will readily appreciate that any one or more of these first order lens properties may be selectively measured using the techique of this invention.

There are many known techniques for measuring the power of purely spherical lenses. Furthermore, there are many well-known techniques for determining both the spherical and cylindrical power of a sphero-cylindrical lens, after the sphero-cylindrical lens system has been properly oriented with respect to the measuring apparatus. That is, the known techniques for measuring the sphero-cylindrical lens powers are accurate only when the sphero-cylindrical system is aligned with the axis of the cylinder either parallel to or perpendicular to predetermined axis of the measurement apparatus.

In the past, proper alignment of the cylinder axis with the measuring equipment has presented a considerable difficulty. However, with the present invention, a sphero-cylindrical optical system may be simply inserted or otherwise accessed at any random orientation with respect to the measurement apparatus of this invention. Thereafter, this invention provides a method and means for accurately positioning the cylinder axis (and thus automatically measuring the relative orientation of this axis) with respect to the measurement apparatus, and for thereafter measuring the spherical and/or cylindrical lens powers. In the preferred embodiment, closed loop servo systems are utilized for automatically positioning the cylinder axis of the sphero-cylindrical as desired with respect to the measurement apparatus and for thereafter automatically measuring the lens powers. However, as those in the art will appreciate, open loop systems coupled with appropriate manual operations and indicators could also be utilized if desired.

The exact detailed optical phenomena underlying the present invention are difficult to explain because they require an understanding of the ways in which light rays are distributed after passing through a sphero-cylindrical optical system. The essential aspects of that distribution are three dimensional in nature while the drawings accompanying this description are necessarily two dimensional. However, since the details of such light distributions are already well-known to those in the art, such details will not now be repeated.

In general, for any purely spherical lens, parallel incident light rays passing within a given plane will also lie within the same plane after refraction by the spherical lens. This same feature is also true when the lens is sphero-cylindrical provided that the plane of incident light is either parallel to or perpendicular to the cylinder axis of the lens.

For purposes of explanation, one may think of a beam of light parallel to the optical axis of the lens and sweeping across the lens in a plane which defines a line perpendicular to the lens optical axis. If the lens is purely spherical, the path swept out by the refracted beam on the other side of the lens at a given distance will also lie within the same plane and define another line within that plane perpendicular to the optical axis of the lens.

As the incident light beam sweeps along the line, the transmitted (i.e., refracted) light is affected by the particular lens cross-section that is being scanned at any given instant. Since the cross section through a sphero-cylindrical lens taken either parallel to or perpendicular to the cylinder axis is identical with a section through some particular purely spherical lens, it necessarily follows that this same kind of action will occur for a sphero-cylindrical lens when the incident light is swept along a line parallel to or perpendicular to the cylinder axis.

However, if the incident light beam defines a line that is not parallel to or perpendicular to the cylinder axis, the motion of the refracted light will not lie in the plane defined by the incident sweeping light beam. Rather, under these conditions, the cross section of the lens does not correspond to a purely spherical lens and therefore acts upon the transmitted light to bend it not only within the plane of the section but also perpendicular to that plane.

It has now been discovered that this phenomena can be successfully utilized for accurately and efficiently detecting the cylinder axis of a sphero-cylindrical optical system and aligning that axis in a predetermined orientation with respect to lens power measuring devices. More specifically, the cylinder axis of a sphero-cylindrical lens is determined according to this invention by detecting the relative orientation of the path of refracted rays with respect to the path of incident rays. If the two paths both lie within the same planes, then these paths are either parallel or perpendicular to the cylinder axis of the lens. On the other hand, if some of the refracted light is refracted outside such a plane, this is an indication that the cylinder axis is not so aligned and that further relative rotation with respect to the line of incident light rays is necessary to effect such alignment before measuring the spherical and/or cylindrical powers.

In the exemplary embodiment, a moveable aperture is positioned between the sphero-cylindrical optical system having an optic axis defined by the intersection of the two orthogonal planes of symmetry of the system and a source of parallel light rays to thus selectively pass an incident beam of such light rays through the aperture and onto the optical system. The aperture is moved transversely to the optic axis along a first line of positions by an electrically driven tuning fork or other appropriate driving means. Accordingly, if one were to look between the moving aperture and the optical system, he would see a moving beam of parallel light rays within a plane defined by the motion of the aperture and which aperture also defines a first line of positions along which such parallel rays are directed towards and across the sphero-cylindrical optical system under test. The refracted rays of light on the other side of the sphero-cylindrical system (or on the same side if a reflective surface such as a retina is positioned on the opposite side of the system) are directed to a further detector which, for the purposes of alignment with the cylinder axis of the system, comprises at least two active elements defining a second line of positions therebetween. This second line of positions is fixed in space in alignment with the first line of positions. In other words, the aperture motion along the first line of positions is always in alignment with and in the same plane with the second line of positions defined by the junction of the two active halves of the photo-detector.

Both the moving aperture and the thus aligned photo-detector are mounted for common rotation relative to the sphero-cylindrical lens system. Of course, it should be apparent that the lens system itself could be rotated instead of the aperture and photo-detector apparatus if that is possible or desired as in the case of a spectacle lens but that in the case of the human eye it is preferable to rotate the apparatus rather than the lens system under test for obvious reasons. When the first line of positions (as defined by the moving aperture) is parallel to or perpendicular to the cylinder axis of the system, that particular cross section of the lens in use will correspond to some purely spherical lens cross section as previously discussed. Accordingly, the refracted light rays will all be bent within the plane defined by the first and second lines of positions and accordingly the refracted light rays will fall right on the second line of positions between the two active halves of the photo-detector.

Of course, if the first line of positions is not aligned parallel or perpendicular to the cylinder axis, then the cross section of the lens then being scanned will not correspond with the cross section of some purely spherical lens, and accordingly, the refracted light will be bent out of the plane defined by the first and second lines of positions. Accordingly, the two halves of the photo-detector will provide outputs indicative of this fact. If a stationary plane of incident light is utilized, this would mean a stationary or DC output from the two photo-detector halves. However, with a moving beam of light as in the exemplary embodiment, the two photo-detectors will be alternately actuated with a phase relationship with respect to the moving light aperture indicative of the relative rotational misalignment between the cylinder axis and the first line of positions. In an open loop system, the difference between the outputs of these photo-detectors may be simply observed from some kind of indicator while relative rotation between the first line of positions and the unknown lens is manually effected for a minimum indication. However, in the exemplary embodiment, the output of the two photo-detectors in phase detected with respect to the aperture movement to provide a servo control signal for driving a servo motor which controls the synchronous rotation of both the detector and the aperture. Accordingly, the apparatus will automatically align itself either parallel to or perpendicular to the cylinder axis of the unknown lens as should not be apparent.

Furthermore, by reversing the polarity of the servo signal delivered to the servo motor, a selection may be made between perpendicular and parallel alignment as desired.

After the measurement apparatus has thus been correctly aligned with the cylinder axis of the unknown system, the system powers may be determined. In the exemplary embodiment, the same beam of moving light is utilized for this purpose.

First of all it should be remembered that when the moving beam of incident light is aligned parallel or perpendicular to the cylinder axis (it will automatically be aligned by this invention as previously discussed) the cross section of the optical system then being used will correspond to some purely spherical lens. Accordingly, a review of elementary optics for spherical lenses will call to mind the fact that all of these rays will be converged to a single point at a distance from the lens equal to the focal distance along this line. Accordingly, when the photo-detector or other target is moved to this point, no motion will be discernible because all the motion is reduced to a single point in space. However, when the detector is in front of or behind the focal point, motion will be apparent on the target space in a direction which is either in-phase or out-of-phase with respect to the motion of the moving light beam incident upon the lens system.

As should now be apparent, this motion will (after previously discussed alignment of the cylinder axis) be along the second line of positions defined as lying between the two active halves of the photo-detector. Actually, in the exemplary embodiment of the invention, the photo-detector comprises four quadrants with outputs of pairs of the quadrants being connected together to first achieve the alignment function previously described. Thereafter, other pairs of the quadrant photo-detector outputs are combined to effectively simulate a photo-detector having active halves which define a third line of positions perpendicular to the second line of positions previously discussed. It should now be apparent that movement between the two halves of the photo-detector thus defined can be detected by differencing the outputs thereof and that a proper servo-control signal may be generated by phase detecting this against another signal synchronous with the incident light beam motion. Such a servo system is then used to drive a servo motor which drives a lead screw or some other arrangement for moving the photo-detector axially with respect to the unknown lens system.

Accordingly, with the apparatus and methods of this invention one can insert (or otherwise access) an unknown sphero-cylindrical optical system in any random position. Thereafter, the machine will automatically align itself parallel with the cylinder axis of the lens (thus providing a relative measurement of the position of this axis) whereupon the power of the lens along the cylinder axis may be measured. Thereafter, the phase connections to the servo motor controlling rotation are reversed causing the system to rotate 90° until the light motion is aligned perpendicularly with respect to the cylinder axis. At this point another measurement of the lens power is made and the difference between this measurement and the previous measurement defines the cylinder power for the optical system under test. Either one of the two power measurements taken by itself may be used to define the spherical power of the lens.

A more complete understanding of the invention and its many advantages may be obtained by reading the following detailed description together with the accompanying drawings, of which:

FIG. 3 is a schematic diagram of the mechanical arrangement of an exemplary embodiment of the invention;

FIG. 4 is a circuit diagram for the exemplary embodiment shown in FIG. 3; and

FIG. 5 is a schematic depiction of the exemplary embodiment adapted for measuring optical parameters of the human eye.

Figure 1:
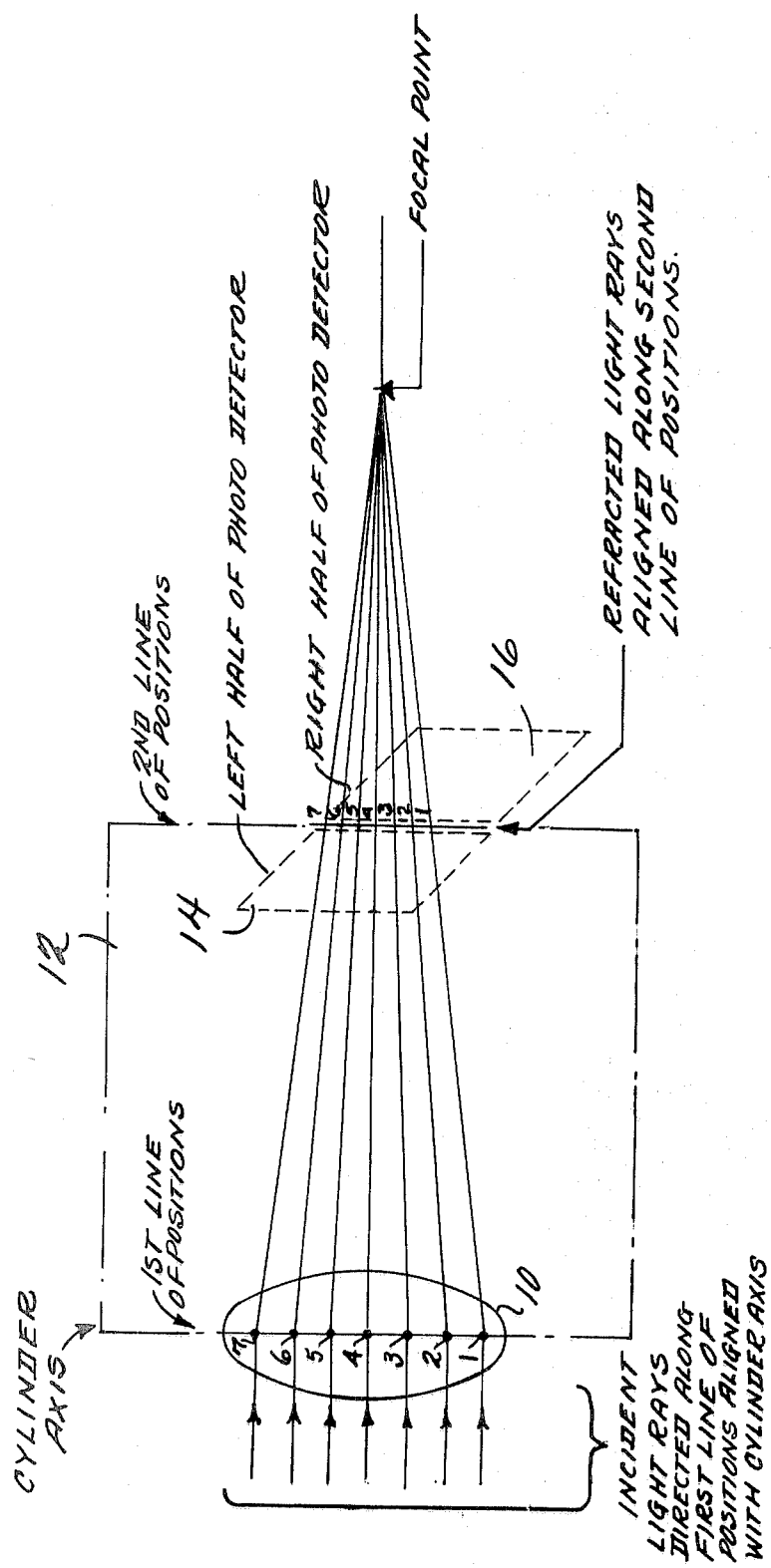
FIGS. 1 and 2 are generalized schematic diagrams for use in explaining the general theory of the invention.

FIG. 1 is a schematic depiction of an exemplary system for explaining the invention in the case that the incident light rays directed along a first line of positions are in alignment with the cylinder axis of the known lens 10 as shown in FIG. 1. As may be seen, light ray 1 (which may actually correspond to a beam of parallel light rays) passes through position no. 1 along the first line of positions and is thereafter incident upon the unknown sphero-cylindrical lens system 10. Since the cross section of the lens at this point corresponds to a purely spherical lens, light ray 1 is refracted within the plane 12 to fall on a corresponding position 1 along a second line of positions also within the plane 12. That is, there is no component of bending acting perpendicular to the plane 12. Similarly with respect to light rays 2, 3, 4, 5, 6 and 7 as should now be apparent to those in the art. Accordingly, along the second line of positions as shown in FIG. 1 (defined by the line between the left-half and right-half photo-detectors 14 and 16 respectively) the output from the further detectors can expect to be at a minimum level or null point as should now be appreciated.

Since the cross section through the lens 10 taken at a right angle to the cylinder axis will also correspond to a purely spherical lens, it also follows that the analysis just given with respect to FIG. 1 will also hold when the first line of positions for the incident light beam is aligned perpendicularly to the cylinder axis instead of parallel to the cylinder axis as actually shown in FIG. 1.

Figure 2:
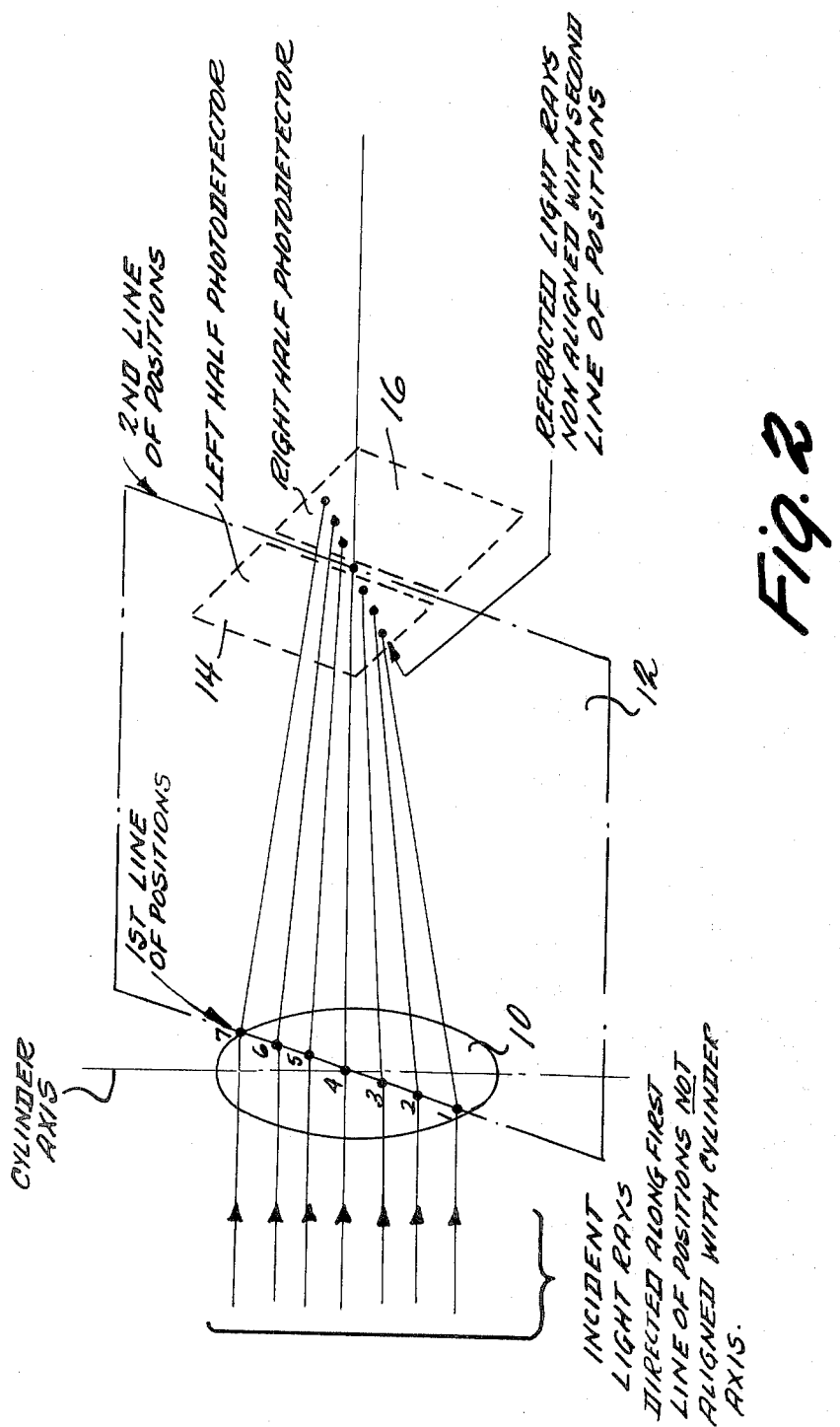

FIG. 2 depicts the situation when the incident light rays directed along the first line of positions is not aligned with the cylinder axis. As shown in FIG. 2, the light ray 1 passes through the first line of positions at point 1 and is bent to the left of plane 12 to fall squarely on the left-half photo-detector 14. Similarly with respect to light beams 2 and 3 while light beam 4 passing through the optical axis of the lens 10 passes between the left and right hand photo-detector 14 and 16 respectively. On the other hand, light rays 5, 6 and 7 experience refraction to the right of plane 12 to fall squarely on the right-half photo-detector 16. That is, the refracted light rays are not aligned with the second line of positions as defined by the junction of the right and left half photo-detectors. This is, of course, due to the fact that the cross section through lens 10 along the first line of positions is no longer equivalent to a purely spherical lens.

It should now be apparent that if the first and second lines of position are rotated synchronously with respect to the sphero-cylindrical system 10 while incident light rays are swept across the first line of positions, alignment, either parallel or perpendicular with the cylinder axis of the lens, may be detected by detecting the null point on the photo-detector outputs.

Furthermore, once the first line of positions is aligned parallel or perpendicular to the cylinder axis thus giving rise to the optical geometry shown in FIG. 1, it should be apparent that as the incident beam of light rays is swept through positions 1 – 7 corresponding movement will be produced at the refracted light rays along positions 1 through 7 at the second line of positions. However, if the second line of positions is translated axially away from the sphero-cylindrical lens system 10 to the focal point shown in FIG. 1, all such motion will cease. While the motion denoted in FIG. 1 (where the second line of positions is between the focal point and the lens system) is in-phase with the movement of incident light rays along position 1 through 7 it should now be apparent to those in the art that similar movements would be out-of-phase or inverted if detected on the other side of the focal point. Since the motion now being detected is along the second line of positions, one way to detect such motion would be to have another set of half plane photo-detectors oriented at 90° with respect to those shown in FIG. 1. Then, by translating these photo-detectors to the focal point or null point (when the output of these photo-detectors is considered), one could measure the distance between the lens 10 and the resulting position of the photo-detectors to determine the power of the lens along the axis then aligned with the first line of positions. In actuality, an exemplary embodiment will now be described which utilizes a single photo-detector split into four quadrants of active elements with the outputs therefrom being combined to effectively provide both the left and right half photo-detectors 14 and 16 as shown in FIG. 1 as well as upper and lower half photo-detectors for detecting motion along the second line of positions as just discussed.

An exemplary embodiment for apparatus to practice the invention is shown in FIG. 3. Parallel light rays 20 are shown as directed generally parallel to the axis of the apparatus. All of these light rays are blocked except those passing through an aperture 22 in one tine of a tuning fork 24 which is electrically driven by an electromagnetic drive 26. Accordingly, the path of aperture motion 28 defines the first line of positions along which incident light rays are incident upon the unknown spherical sphero-cylindrical system 10 as shown in FIG. 3. As will be apparent to those in the art, many other kinds of scanners and/or successively fired individual light sources, etc., could be used to project the incident light rays along the first line of positions 28 as shown in FIG. 3.

The source of these incident light rays is angularly fixed with respect to photo-detector 30 which itself comprises four quadrant sections $a$, $b$, $c$, and $d$ and is mounted upon a bar 32 which is, in turn, moveably attached to beam 34 such that the entire photo-detector assembly on bar 32 is moveable in the axial $z$-direction but is fixed with respect to the first line of positions 28 in the $x$ and $y$ directions. As shown in FIG. 3, the line defined by the juncture of quadrant photo-detectors $a$, $c$, and $b$, $d$ (labeled line 36) defines the second line of positions as discussed with respect to FIGS. 1 and 2. This second line of positions 36 is fixedly aligned with the first line of positions 28 as defined by the path of aperture motion as should now be apparent. The entire assembly of light source and photo-detector is attached to beam 34 which is in turn rotatably mounted within a bearing 38. As shown in FIG. 3 a servo motor 40 is used to rotate shaft 42 within bearing 38 and thus change the relative angular position of the plane (labeled 12 in FIGS. 1 and 2) passing through the first line of positions 28 and the second line of positions 36 with respect to the sphero-cylindrical lens 10. Accordingly, regardless of what random orientation might have existed when the unknown lens 10 is first inserted into some sort of conventional lens holder (not shown) the servo motor 40 is capable of rotating the apparatus such that the first line of positions 28 is aligned either parallel or perpendicular to the cylinder axis of the unknown lens. This will of course be accomplished by using the output of the quadrant photo-detector 30 where the outputs from quadrants $a$ and $c$ and the outputs from quadrants $b$ and $d$ are utilized to drive the servo motor 40 to a null point as will be later described in more detail.

Once the first line of positions 28 has been thus aligned with the cylinder axis, the resulting angular positions of shaft 42 may, of course, be used as a direct indication of the relative orientation of the cylinder axis on the unknown lens 10 as should now be apparent. An appropriate indicator and/or scale such as 44 may be used to obtain this indication and/or some kind of automatic encoding or measuring device may be utilized to get a readout of data providing such information. Further marking apparatus may be devised for automatically marking the lens itself after such alignment has been achieved if desired as should be apparent to those in the art.

After such alignment has been achieved, the lens power along the first line of positions may then be measured by axially moving the photo-detector assembly 30 until the outputs from quadrants $a$, $b$ and $c$, $d$ indicate a null point in detecting movement across line 46 defined by the junction of these pairs of quadrants which line is of course perpendicular to the second line of positions 36 as shown in FIG. 3. The axial position along the $z$ axis of the photo-detector 30 may be changed by adjusting the lead screw 48 either manually or with the servo motor 50 as shown in FIG. 3. Of course, when the servo motor 50 is used it will automatically be driven to a servo null point (minimum output level) by the outputs of quadrants $a$, $b$ and $c$, $d$ as will be explained in more detail below.

One the lens power along the axis of the cylinder has been thus determined (by measuring the distance between the lens and the final position of the photo-detector 30), the polarity of the servo signal used to drive motor 40 may be reversed thus causing the motor 40 to rotate the entire detecting and light source apparatus by 90° until it is aligned perpendicularly to the cylinder axis whereupon the same kind of lens power measurement may be made either manually or automatically by moving the quadrant photo-detector 30 with with the lead screw 48 until a further null point (minimum) is again detected whereupon the lens power along the direction perpendicular to the cylinder axis may be measured as the resulting distance between the lens 10 and the photo-detector 30 which may, for instance, be indicated by a pointer and scale arrangement such as shown generally at 52 in FIG. 3. Of course, conventional analog-to-digital converters may be used instead of the pointers and scale indicators 44 and 52 to obtain direct digital outputs representing the cylinder axis, cylinder power and spherical power. Further, as previously indicated, the spherical power may be defined as either one of the two powers of the system measured when the first line of positions 28 is either aligned parallel to or perpendicular to the cylinder axis. The cylinder power is then defined as the difference between these two measurements.

The electrical circuits for the exemplary system of FIG. 3 are shown in FIG. 4. Here, the light beam positions of the refracted light positions 1 through 7 are shown as they would fall on the photo-detector 30 in the case of non-alignment as depicted in FIG. 2. The individual output from quadrant photo-detector cells $a$, $b$, $c$, and $d$ are input respectively to amplifiers 100, 102, 104, and 106. These amplifiers act both to increase the signal level of the photo-detector outputs and to isolate the photo-detectors from subsequent circuitry used for combining these various signals.

As shown in FIG. 4, the outputs from these amplifiers are added through sets of summing resistors and input to summing and differencing amplifiers 108 and 110 to result in a y-difference signal on line 112 and an x-difference signal on line 114. The y-difference signal on line 112 comprises the combined output of the quadrant pair c and d subtracted from the quadrant pair a and b. As may be seen, this effectively subtracts outputs generated by light falling below line 46 from outputs generated by light falling above line 46. In other words, the a.c. magnitude of the y-difference signal on line 112 is proportional to the movement on the photo-detector in the y-axis directions and (if linear amplifiers, photo-detectors, etc., are utilized) may be directly input to an open loop lens power indicator 116 as shown by dotted lines in FIG. 4. If the axial adjustment of the photo-detector along the z-axis is to be made automatic with a closed loop servo system, the y-difference signal on line 112 is input to a phase sensitive discriminator 118 which also receives a signal from the master oscillator 120 on line 132. Of course, the signal on line 122 should be in synchronism with the actual movement of the moveable aperture 22. The output from the phase sensitive discriminator 118 then has a magnitude proportional to the magnitude of the y-difference signal and a polarity dependent upon the phase relationship between the y-difference signal on line 112 and the master oscillator signal on line 122 as should be apparent to those in the art. The open loop indicator 116 is thus preferably driven by the output of the discriminator 118 as shown by a solid line in FIG. 4, to permit open loop readout of the phase information. Accordingly, if the servo output signal on line 124 is used to drive the axial servo motor 40, the servo motor 40 will automatically be driven in the proper direction until the y-difference signal is nulled thus permitting a reading of the lens power along the first line of position off scale 52 or the output of some analog-to-digital converter or the like as should now be apparent.

The x-difference signal on line 114 may be seen to comprise the difference in signals from quadrant pair b and c and quadrant pair a and d. This is, in reality, the difference between signals generated as a result of light falling on the right-half of photo-detector 30 and on the left-half of photo-detector 30, which left and right halves are of course used to define the second line of positions 36 as previously discussed. The magnitude of the a.c. signal on line 114 will also be directly indicative of the misalignment between the cylinder axis and the first line of positions. Accordingly, this signal may be directly input to an open loop indicator 126 as shown by dotted lines in FIG. 4. On the other hand, if a closed loop automatic system is desired, the x-difference signal on line 114 would be input to a phase sensitive discriminator 128 similar to 118. Discriminator 128 also receives the master oscillator signal from line 122 and the output on line 130 has a magnitude representative of the a.c. magnitude of the x-difference signal on line 114 and a polarity dependent upon the phase relationship between the x-difference signal and the master oscillator signal as should now be apparent to those in the art. As shown by a solid line in FIG. 4, the open loop indicator 126 is preferably driven by the output of discriminator 128 to permit reading out the relative phase information as well as magnitude.

This servo drive signal on line 130 is passed through a polarity reversing switch 132 to the angle drive servo motor 50. When the polarity reversing switch 132 is in a first position the angle servo motor 50 will drive shaft 42 and all the connected light source and detector apparatus until the first line of positions 128 is parallel to the cylinder axis as should now be apparent. When this null point is reached, servo motor 40 should be actuated to take a lens power reading for this alignment.

Thereafter, the polarity reversing switch 132 should be thrown in the opposite direction and the angle servo motor 50 will then drive the shaft 42 through 90° until the first line of positions 28 is perpendicularly aligned with respect to the cylinder axis of the lens 10. At this point the axial servo motor 40 may again be actuated to take another lens power reading and the difference between these two readings will of course comprise the cylinder power as previously discussed. Either one of the two readings may be taken for the spherical power of the lens.

Those in the art will readily appreciate that this just discussed sequence of operations may be automatically carried forth with appropriate conventional sequence control logic to result in a completely automatic apparatus. If the apparatus is also provided with appropriate analog-to-digital and print out equipment one might slightly insert the unknown lens in any random fashion within an appropriate lens holder and push a button whereupon all of the just discussed functions would be carried forth automatically with the cylinder axis, spherical power and cylinder power either being marked directly on the lens itself or printed on a piece of paper or otherwise recorded for any desired ultimate use.

FIG. 5 reveals one possible adaptation of system of FIG. 3 for analyzing the human eye. Here the incident light beam 150 is disposed 90° to the eye's optical axis and directed towards a partially silvered mirror (beam splitter) 152. Part of the incident beam is reflected from mirror 152 through the eye's optical system 154. The reflection from retina 156 is redirected through the optics 154 and part of this passes directly through the beam splitter 152 and travels on to the photo-detector 30 as in the earlier explained embodiment.

As incident beam 150 is scanned along arrows 158, the eye's optical system will be scanned as shown by arrows 160 along a first line of positions exactly similar to the aperture path 28 in FIG. 3. As should now be apparent, the same considerations previously discussed will exist here. Namely, as the scanning incident beam and photo detector 30 are synchronously rotated with respect to the eye, the refracted beam falling onto photo-detector 30 will describe the predetermined second line of positions only when the first line of positions is aligned parallel or perpendicular to the test optical system cylinder axis.

Of course thos in the those will now appreciate that scanning incident beam 150 could be generated by the vibrating aperture of FIG. 3 (re-oriented by 90°), a series of sequentially actuated light sources or any other such conventional techniques.

In particular, it is perfectly feasible to use only two light source positions along the first line of positions. For instance, positions 1 and 7 as shown in FIG. 1 could be alternately actuated to constitute the necessary "scanning" of incident light along the first line of positions as should now be apparent.

Although only a few specific examples have been shown, those in the art will appreciate that many modifications of the exemplary embodiment are possible without in any way departing from the essential teachings of the invention. For instance, if one wanted to use a completely d.c. system, a complete plane of incident light might be utilized to define a first line of positions instead of a moving aperture. That is, a line defining aperture could be stationary with a d.c. output from the various photo-detector quadrants being used to drive conventional servo systems and/or open loop indicators as appropriate. Many other modifications will be readily apparent to those in the art. Accordingly, all such modifications are intended to be included within this invention.

What is claimed is:

1. Apparatus for measuring optical properties of a sphero-cylindrical optical system having an optical axis defined by the intersection of two orthogonal planes of symmetry of the system, said apparatus comprising:
    source means for providing beams of incident light parallel to each other and to the optical axis across said sphero-cylindrical system along a first line of positions,
    first control means including means for detecting the location of the refracted light emergent from the optical system along predetermined second line of positions and means for relatively rotating source means and the detecting means with respect to the sphero-cylindrical system to thereby change the relative rotational position of said first line of positions and said sphero-cylindrical system in response to said detected location of refracted light until the refracted light emergent therefrom is aligned in a common plane along said second line of positions with said first line of positions thereby signifying that said first line of positions is parallel or perpendicular to the cylinder axis of said sphero-cylindrical optical system, and
    measurement means for measuring predetermined optical properties of the sphero-cylindrical system after thus aligning the first line of positions.

2. Apparatus as in claim 1 wherein said first control means comprises a servo controlled motor for automatically effecting the relative rotation of said first line of positions with respect to said sphero-cylindrical optical system until said parallel or perpendicular alignment is achieved.

3. Apparatus as in claim 2 wherein said first control means includes a reversing switch for said servo controlled motor to effect selection between said parallel and perpendicular alignments.

4. Apparatus as in claim 1 wherein said measurement means comprises:
    photo-detector means for detecting the extent of refracted light along said path of refracted light after said path of refracted light has been aligned with said second line of positions.

5. Apparatus as in claim 1 wherein:
    said source means comprises means for cyclically providing said beams of incident light,
    said first control means comprises a photo-detector having at least two active sections defining said second line of positions,
    said source means and said photo-detector being rotationally fixed with respect to each other to permit common relative rotation between (a) said first and second lines and (b) said sphero-cylindrical optical system and where said first and second lines of positions are fixedly aligned such that the cyclically produced refracted light beams are across said second line of positions except when the first line of positions is parallel or perpendicular to the cylindrical axis of the sphero-cylindrical optical system whereat the refracted light beams are substantially along said second line of positions.

6. Apparatus as in claim 5 wherein said first control means further comprises:
    difference means connected to provide a difference signal representing the difference between the outputs of said at least two active photo-detector sections, and
    servo control means responsive to said difference signal for automatically rotating the relative position of said first line of positions and said sphero-cylindrical system until the difference signal indicates that said refracted light beams are substantially along said second line of positions.

7. Apparatus as in claim 5 wherein:
    said photo-detector means comprises four quadrants of active sections with the outputs from pairs of the quadrants being combined to simulate two active semi-circle areas defining said second line of positions therebetween.

8. Apparatus as in claim 7 wherein said measurement means comprises:
    means for combining the outputs from other pairs of quadrants to simulate further active semi-circle areas defining a third line of positions perpendicular to said second line of positions,
    axial movement means for changing the axial distance between said photo-detector and said sphero-cylindrical system, and
    axial servo control means responsive to the difference between output signals from said further active semi-circle areas and to the phase of this difference with respect to said cyclically produced incident light beams along said first line of positions for automatically driving said axial movement means until the axial position of said photo-detector is a measurement of the lens power of the sphero-cylindrical system along said first line of positions.

9. Apparatus for measuring optical properties of a sphero-cylindrical optical system having an optical axis defined by the intersection of two orthogonal planes of symmetry of the system, said apparatus comprising:
    a source of incident light rays parallel to each other and to the optical axis and directed toward said optical system defining a first line extending across said sphero-cylindrical system,
    means for effecting relative rotation between said first line and said sphero-cylindrical system,
    means for detecting the orientation of said light rays which are refracted by emergent light from said sphero-cylindrical system with respect to a second line fixedly aligned with said first line,
    means for driving said effecting means in response to said detecting means to align said refracted light rays with said second line, and
    means for measuring predetermined optical properties of said sphero-cylindrical system when said refracted light rays are aligned with said second line.

10. Apparatus as in claim 9 wherein said source of light rays comprises:
- a movable aperture disposed between said sphero-cylindrical system and a source of parallel light rays, and
- means for moving said aperture such that light passing therethrough defines a plane, said first line being within said plane and perpendicular to the optical axis of said sphero-cylindrical system.

11. A method for measuring optical properties of a sphero-cylindrical optical system having an optical axis defined by the intersection of two orthogonal planes of symmetry of the optical system, said method comprising:
- providing beams of incident light parallel to each other and to the optical axis across said sphero-cylindrical system along a first line of positions, automatically detecting the location of the refracted light emergent from the optical system,
- effecting relative rotation between said first line of positions and said sphero-cylindrical system in response to said detecting step until the path of refracted light emergent therefrom is aligned in a common plane with said first line of positions thereby signifying that said first line of positions is parallel or perpendicular to the cylinder axis of said sphero-cylindrical system, and
- measuring predetermined optical properties of the sphero-cylindrical optical system after such alignment is achieved.

12. A method as in claim 11 wherein said measuring step comprises:
- reading the resulting angle of relative rotational position between said first line of positions and said sphero-cylindrical optical system as a measure of the position of the cylinder axis of said sphero-cylindrical system.

13. A method as in claim 11 wherein said measuring step comprises:
- measuring the spherical powers of said sphero-cylindrical system at both said parallel and perpendicular relative rotational positions and obtaining the difference between these spherical powers as the cylinder power of said sphero-cylindrical optical system.

14. Apparatus for measuring optical properties of a sphero-cylindrical optical system having an optical axis defined by the intersection of two orthogonal planes of symmetry of the optical system, said apparatus comprising:
- source means for providing incident light beams parallel to each other and to the optical axis across said sphero-cylindrical system along a first line of positions,
- first control means for rotating the relative position of said first line of positions and said sphero-cylindrical system until the path of the refracted light emergent therefrom is aligned with said first line of positions thereby signifying that said first line of positions is parallel or perpendicular to the cylinder axis of said sphero-cylindrical optical system,
- measurement means for measuring predetermined optical properties of the sphero-cylindrical system after thus aligning the first line of positions,
- said source means comprising a movable light source for sequentially providing said light beams,
- said first control means comprising a photo-detector having at least two active sections defining a second line of positions,
- said movable light source and said photo-detector being mounted for common rotation with respect to said sphero-cylindrical optical system and where said first and second lines of positions are fixedly aligned such that the scan path of the refracted light beam passes across said second line of positions except when the first line of positions is parallel or perpendicular to the cylindrical axis of the sphero-cylindrical optical system whereat said scan path is substantially along said second line of positions,
- said first control means further comprising:
  - difference means connected to provide a difference signal representing the difference between outputs of said at least two active photo-detector sections, and
  - servo control means responsive to said difference signal for automatically rotating the relative position of said first line of positions and said sphero-cylindrical system, until the difference signal indicates that said scan path of refracted light is substantially along said second line of positions, and
- said servo control means comprising:
  - phase sensitive discriminator means responsive to said difference signal and to a reference signal from said source means synchronous with the light beam movement along said first line of positions for providing an output representing the magnitude of the difference signal and the phase relationship between said difference signal and said reference signal,
  - switch means for reversing the polarity of the output from said phase-sensitive discriminator means, and
  - a servo motor responsive to the output from the phase-sensitive discriminator means as selected by said switch means.

15. Apparatus for measuring optical properties of a sphero-cylindrical optical system having an optical axis defined by the intersection of two orthogonal planes of symmetry of the optical system, said apparatus comprising:
- source means for sequentially providing incident light beams parallel to each other and to the optical axis across said sphero-cylindrical system along a first line of positions,
- first control means for rotating the relative position of said first line of positions and said sphero-cylindrical system until the path of the refracted light emergent therefrom is aligned with said first line of positions thereby signifying that said first line of positions is parallel or perpendicular to the cylinder axis of said sphero-cylindrical optical system,
- measurement means for measuring predetermined optical properties of the sphero-cylindrical system after thus aligning the first line of positions,
- said measurement means comprising photo-detector means for detecting refracted light beam movement along said path of refracted light after said path of refracted light has been aligned with said second line of positions, wherein said photo-detector means is axially movable with respect to said sphero-cylindrical system such that minimum refracted light beam movement along said path of refracted light occurs when said photo-detector means is positioned in a focal plane of said sphero-cylindrical system whereat the distance between the photo-detector means and the sphero-cylindrical system is a measure of its power along the line of first positions and wherein said measurement means includes means for driving the photo-detector means along said optical axis and means for detecting the inversion phase of the refracted light beams as the detector passes through the focal points.

16. Apparatus as in claim 15 wherein said measurement means further comprises servo control means for automatically axially driving said photo-detector.

17. Apparatus for measuring optical properties of a sphero-cylindrical optical system, said apparatus comprising:
a source of light rays defining a first line extending across said sphero-cylindrical system,
means for effecting relative rotation between said first line and said sphero-cylindrical system,
means for detecting the orientation of the path of said light rays which are refracted by emergent light from said sphero-cylindrical system with respect to a second line fixedly aligned with said first line,
means for measuring predetermined optical properties of said sphero-cylindrical system when the path of said refracted light rays are aligned with said second line,
said source of light rays and said means for detecting being mounted together for common rotation with respect to said sphero-cylindrical system, and wherein
said means for detecting is also axially movable with respect to said sphero-cylindrical optical system and where said means for detecting is a part of said means for measuring in that its axial position is used to derive a measure of the power of said sphero-cylindrical system while its rotational position is a measure of the cylinder axis of the sphero-cylindrical system.

18. Apparatus for measuring optical properties of a sphero-cylindrical optical system having an optical axis defined by intersection of two orthogonal planes of symmetry of the system, said apparatus comprising:
source means for providing beams of incident light parallel to each other and to the optical axis across said sphero-cylindrical system along a first line of position,
first control means for rotating the relative position of said first line of positions and said sphero-cylindrical system until the path of the refracted light emergent therefrom is aligned in a common plane with said first line of positions thereby signifying that said first line of positions is parallel or perpendicular to the cylinder axis of said sphero-cylindrical optical system, and
measurement means for measuring predetermined optical properties of the sphero-cylindrical system after thus aligning the first line of positions, wherein,
said source means comprises a movable light source, for sequentially providing said incident light beams,
said first control means comprises a photo-detector having at least two active sections defining a second line of positions, and
said movable light source and said photo-detector are mounted for common rotation with respect to said sphero-cylindrical optical system and where said first and second lines of positions are fixedly aligned such that the scan path of the refracted light beam passes across said second line of positions except when the first line of positions is parallel or perpendicular to the cylindrical axis of the sphero-cylindrical optical system whereat said scan path is substantially along said second line of positions.

19. Apparatus as in claim 18 wherein said first control means further comprises:
difference means connected to provide a difference signal representing the difference between outputs of said at least two active photo-detector sections, and
servo control means responsive to said difference signal for automatically rotating the relative position of said first line of positions and said sphero-cylindrical system, until the difference signal indicates that said scan path of refracted light is substantially along said second line of positions.

20. Apparatus as in claim 18 wherein:
said photo-detector means comprises four quadrants of active sections with the outputs from pairs of the quadrants being combined to simulate two active semi-circle areas defining said second line of positions therebetween.

21. Apparatus as in claim 20 wherein said measurement means comprises:
means for combining the outputs from other pairs of quadrants to simulate further active semi-circle areas defining a third line of positions perpendicular to said second line of positions,
axial movement means for changing the axial distance between said photo-detector and said sphero-cylindrical system, and
axial servo control means responsive to the difference between output signals from said further active semi-circle areas and to the phase of this difference with respect to light beam movements along said first line of positions for automatically driving said axial movement means until the axial position of said photo-detector is a measurement of the lens power of the sphero-cylindrical system along said first line of positions.

22. Apparatus for measuring optical properties of a sphero-cylindrical optical system having an optical axis defined by the intersection of two orthogonal planes of symmetry of the system, said apparatus comprising:
a source of incident light rays parallel to each other and to the optical axis and directed toward said optical system defining a first line extending across said sphero-cylindrical system.
means for effecting relative rotation between said first line and said sphero-cylindrical system,
means for detecting the orientation of the path of said light rays which are refracted by emergent light from said sphero-cylindrical system with respect to a second line fixedly aligned with said first line, and
means for measuring predetermined optical properties of said sphero-cylindrical system when the path of said refracted light rays is aligned with said second line,
wherein
said source of light rays and said means for detecting are mounted together for common rotation with respect to said sphero-cylindrical system.

23. Method for measuring optical properties of a sphero-cylindrical optical system having an optical axis defined by the intersection of two orthogonal planes of symmetry of the optical system, said method comprising:
cyclically providing incident light beams parallel to each other and to the optical axis across said sphero-cylindrical system along a first line of positions, rotating the relative position of said first line of positions and said sphero-cylindrical system until the path of the refracted light emergent therefrom is aligned with said first line of positions thereby signifying that said first line of positions is parallel or perpendicular to the cylinder axis of said sphero-cylindrical optical system,
measuring predetermined optical properties of the sphero-cylindrical system after thus aligning the first line of positions by driving said photo-detector means along said optical axis and detecting the inversion of phase of the refracted light beams along said path of refracted light after said path of refracted light has been aligned with said second line of positions as the detector passes through the focal points of the system.

24. Method for measuring optical properties of a sphero-cylindrical optical system, said method comprising:
defining a first line of parallel incident light rays extending across said sphero-cylindrical system,
effecting relative rotation between said first line and said sphero-cylindrical system,
detecting the orientation of the path of said light rays which are refracted by emergent light from said sphero-cylindrical system with respect to a second line fixedly aligned with said first line,
measuring predetermined optical properties of said sphero-cylindrical system when the path of said refracted light rays is aligned with said second line, the alignment of said second line and refracted light rays being achieved by commonly rotating said first and second lines of positions with respect to said sphero-cylindrical system, and wherein
said measuring step includes axial movement of the second line of positions to derive a measure of the power of said sphero-cylindrical system while the relative rotational position of said second line of positions is a measure of the cylinder axis of the sphero-cylindrical system.

* * * * *